United States Patent [19]

Mace

[11] Patent Number: 4,472,183

[45] Date of Patent: * Sep. 18, 1984

[54] METHOD AND APPARATUS FOR TENSIONING BAG FILTERS

[75] Inventor: Robert E. Mace, Jackson County, Mo.

[73] Assignee: Standard Havens, Inc., Kansas City, Mo.

[*] Notice: The portion of the term of this patent subsequent to Aug. 2, 2000 has been disclaimed.

[21] Appl. No.: 515,803

[22] Filed: Jul. 21, 1983

Related U.S. Application Data

[63] Continuation-in-part of Ser. No. 341,777, Jan. 22, 1982, Pat. No. 4,396,408.

[51] Int. Cl.³ .............................................. B01D 46/02
[52] U.S. Cl. .......................................... 55/378; 55/97; 254/93 R; 254/199
[58] Field of Search ......................... 254/93 R, 199 R; 55/378, 379, 304, 305, 97

[56] References Cited

U.S. PATENT DOCUMENTS

| 3,730,481 | 5/1973 | Ekonen et al. | 254/93 R |
| 3,898,067 | 8/1975 | Genton | 55/378 |
| 4,123,027 | 10/1978 | Huntington | 55/378 |
| 4,340,401 | 7/1982 | Weelden et al. | 55/378 |
| 4,364,758 | 12/1982 | Clements et al. | 55/379 |

FOREIGN PATENT DOCUMENTS 868180  5/1961  United Kingdom .................. 55/378

Primary Examiner—Bernard Nozick
Attorney, Agent, or Firm—Kokjer, Kircher, Bradley, Wharton, Bowman & Johnson

[57] ABSTRACT

Installation and maintenance equipment to tension a fabric sleeve filter supported from a bag support frame in a baghouse by a retainer rod and a tensioning spring. A tensioning tool is configured to be removably coupled to the retainer rod while compressing the tensioning spring to pull taut the fabric sleeve. A speed control regulates the speed at which the spring is compressed and a regulator determines the force applied to the spring. A pneumatic, hydraulic or electromechanical power source supplies the tensioning force.

10 Claims, 9 Drawing Figures

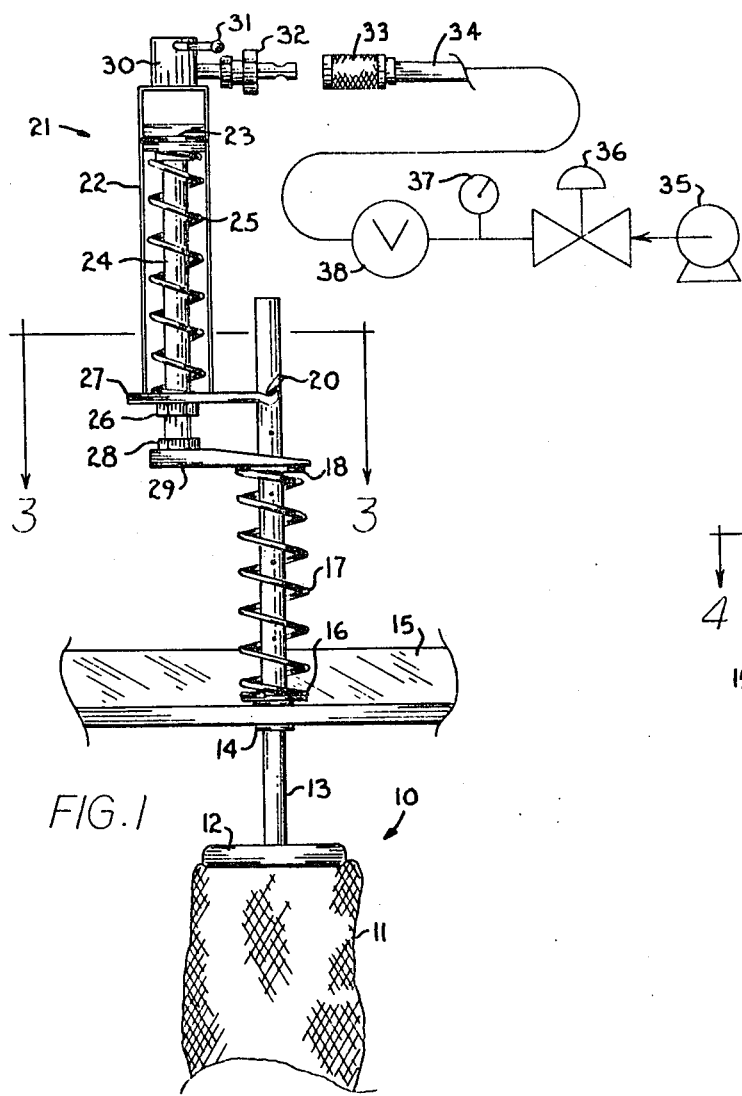
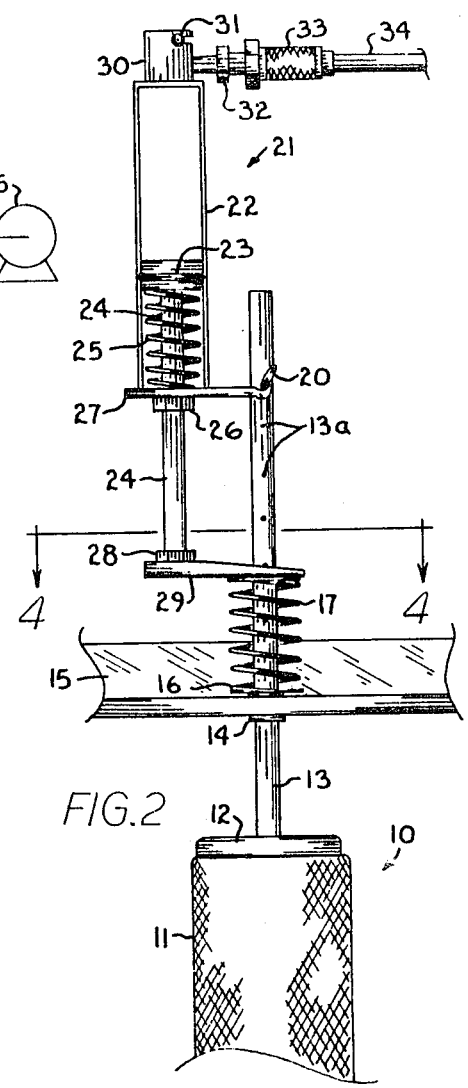
FIG.1
FIG.2
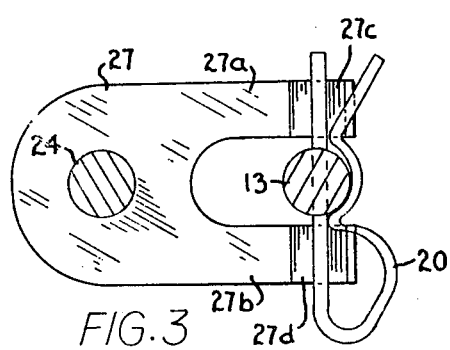
FIG.3
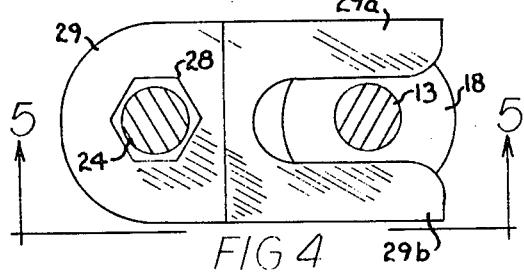
FIG.4
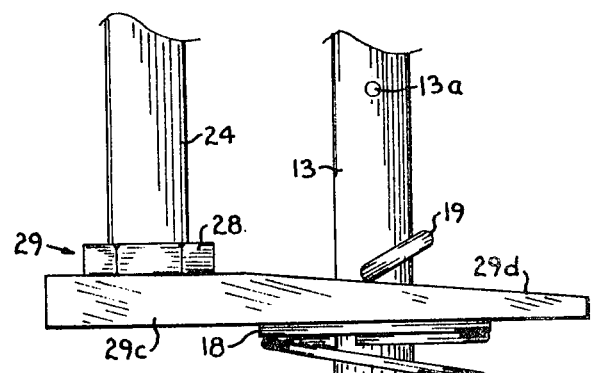
FIG 5

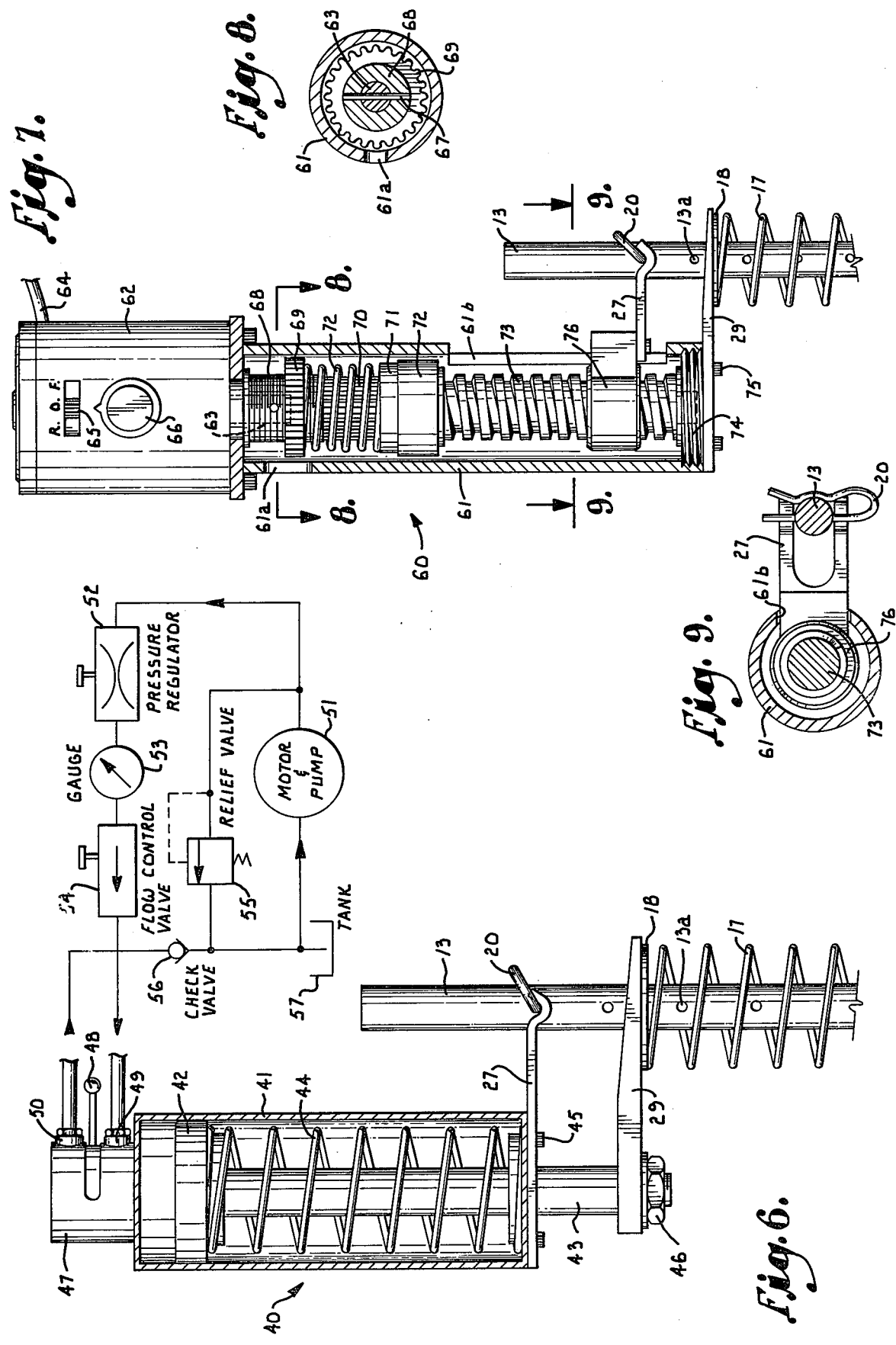

METHOD AND APPARATUS FOR TENSIONING BAG FILTERS

BACKGROUND AND SUMMARY OF THE INVENTION

This application is a continuation-in-part application of my copending application Ser. No. 341,777, filed Jan. 22, 1982 and issuing as Pat. No. 4,396,408 Aug. 2, 1983.

This invention relates to industrial baghouses and, more particularly, to method and apparatus for tensioning cylindrical filter bags.

Continuous emphasis on environmental quality has resulted in increasingly strenuous regulatory controls on industrial emissions. One technique which has proven highly efficient in controlling air pollution has been the separation of undesirable particulate matter from a gas stream by fabric filtration.

Such filtration is carried out in dust collection apparatus known in the trade as a "baghouse" which operates on the same general principle as an ordinary household vacuum cleaner, except on a much larger scale. Basically, the baghouse is a sheet metal housing divided into two chambers, referred to as plenums, by a tube sheet. Disposed within openings in the tube sheet are fabric filters. A dust-laden gas stream induced by the action of a fan, blows into one chamber (dirty air plenum) wherein dust accumulates on the fabric filter as the gas passes through the fabric into the other chamber (clean air plenum) and out an exhaust.

Although all baghouses are designed in accordance with the foregoing general principles, there are numerous operational and structural distinctions. The present invention relates to a baghouse wherein a plurality of cylindrical filter sleeves having closed upper ends are vertically suspended in the clean air plenum from a bag support framework. The lower ends of the bags are fixed to openings in a tube sheet or cell plate. Filtration of the process gas occurs from inside to outside of the bags. As a result, baghouses constructed in this manner are normally referred to as inside-to-outside bag collectors.

During continuous operation of the baghouse, the bags must be periodically cleaned to remove the filter cake which accumulates within the cylindrical sleeve. This may be done by interrupting the flow of process gas carrying particulate matter and then causing reverse cleaning air to flow from the clean air plenum to the dirty air plenum. The reverse flow of cleaning air causes the dust cake to be dislodged and fall through the interior of the bag to the dirty air plenum for removal by an auger or similar means. In some baghouse installations, reverse air cleaning may also be supplemented with mechanical shaking of the filters.

The air cleaning process reverses the pressure drop the fabric filter normally experiences during filtering operation. In other words, the filter sleeve tends to collapse inwardly when being cleaned. This tendency is limited somewhat by circular support rings sewn to the outside of the bag at spaced intervals along its length.

Proper tensioning of the bags plays an important role in limiting fabric collapse during the cleaning process. If the bags are stretched too tightly between the supporting framework and the cell plate, the bags do not collapse during cleaning, but they tend to wear out quickly. If, on the other hand, the bags are installed too loosely, the fabric between adjacent skeletal support rings collapses during cleaning and will not permit the dust cake to fall through the bag to the bottom of the dirty air plenum.

Even when a bag filter is properly installed and tensioned correctly, it is reasonable to expect the fabric to stretch slightly with age and with repeated cyclings between filtering and cleaning operations. Thus, the bags must be periodically checked and the tension readjusted for each bag from time to time.

The installation and maintenance of filter bags of this genre has traditionally been a time consuming, costly and disagreeable task. Accordingly, there is a long felt need in this industry for improvements in filter bag assemblies and in techniques to alleviate the many installation and maintenance difficulties which have been encountered in the past. The primary goal of this invention is to meet this need.

More specifically, an object of this invention is to provide a method and apparatus for tensioning cylindrical bag filters to decrease installation and maintenance time and cost heretofore associated with baghouse operations. Also, the improved method and apparatus achieves the added advantage of prolonging bag life which, in turn, results in a less rigorous maintenance schedule.

Another object of the invention is to provide a method and apparatus for properly tensioning filter sleeves to permit controlled flexure of the bags during the cleaning cycle.

An additional object of the invention is to provide a method and apparatus for tensioning filter bags for quick and safe installation or maintenance by semi-skilled personnel. Installation and proper tensioning can be accomplished by one or two workmen who can achieve uniformly tensioned bags in minimal time. Thus, the method and equipment preserve high morale during bag installation or replacement which has traditionally been considered an unpleasant job in the hostile environment of a baghouse.

A further object of the invention is to provide a bag retainer assembly which may be easily and quickly removed whenever replacement of the filter becomes necessary.

Yet another object of the invention is to provide a self tensioning bag retainer which accommodates the anticipated stretching of the filter bag over time and which adjustably maintains appropriate tension on the filter.

Other and further objects of the invention, together with the features of novelty appurtenant thereto, will appear in the course of the following description of the drawing.

DESCRIPTION OF THE DRAWING

In the accompanying drawing, which forms a part of the specification and is to be read in conjunction therewith, and in which like reference numerals are employed to indicate like parts in the various views:

FIG. 1 is a side elevational view, partially schematic, of tensioning apparatus and a compression spring retainer for a bag filter illustrative of the technique and equipment for tensioning bag filters for which this invention is designed by means of a pneumatic pressure force;

FIG. 2 is a side elevational view similar to FIG. 1, showing the tensioning tool compressing the spring retainer to apply appropriate tension to the filter bag;

FIG. 3 is an enlarged top plan view of the upper foot of the tensioning tool taken along line 3—3 of FIG. 1 in the direction of the arrows;

FIG. 4 is an enlarged, top plan view of the lower foot of the tensioning tool taken along line 4—4 of FIG. 2 in the direction of the arrows;

FIG. 5 is an enlarged side elevational view taken along line 5—5 of FIG. 4 in the direction of the arrows;

FIG. 6 is a fragmentary, side elevational view, partially schematic, of a second embodiment of the invention illustrative of the technique and equipment for tensioning bag filters by means of a hydraulic pressure force;

FIG. 7 is a fragmentary, side elevational view of a third embodiment of the invention illustrative of the technique and equipment for tensioning bag filters by means of an electromechanical force;

FIG. 8 is a sectional view taken along line 8—8 of FIG. 7 in the direction of the arrows; and FIG. 9 is a sectional view taken along 9—9 of FIG. 7 in the direction of the arrows.

A more detailed description of the general construction of a baghouse, inside-to-outside filtration sleeves, and their mountings is found in U.S. Pat. No. 4,364,758, issued Dec. 21, 1982, which is incorporated herein by reference.

As described in the incorporated reference, a plurality of filter assemblies are supported within the clean air plenum by a bag support network which is constructed of angle iron members. The bag support framework can similarly be constructed of C-shaped channel or flat iron and may be equipped with mechanical shaking apparatus as is known to be conventional in this art.

Each filter assembly 10, the upper portion of one being shown in FIGS. 1 and 2, includes a cylindrical sleeve filter 11. The lower end of each sleeve filter 11 is fitted over a cylindrical flange of the cell plate and secured thereto by a clamping band. At spaced intervals along the length of the filter sleeve are sewn skeletal support rings to prevent collapse of the bag during reverse air cleaning. At the upper end of the filter sleeve 11, the fabric is lapped on itself and stitched to form a cuff. A continuous rigid band is disposed within the cuff. The upper end of the filter sleeve is carried on an inverted cylindrical retainer cup 12 having a cylindrical side wall which terminates in a peripheral ridge. The rigid band within the cuff of the filter sleeve 11 is slightly larger in diameter than the cylindrical side wall of the retainer 12, but slightly less in diameter than the peripheral ridge. Thus, the cuff and rigid band are pressingly fit onto the cylindrical side wall of the retainer cup 12 to sealingly close the upper end of the filter sleeve 11. Fixed to the center of the retainer cup 12 and extending upwardly therefrom is an elongate rod 13. The rod is laterally bored with holes 13a at spaced intervals.

The rod 13 received by a bushing 14 on the horizontal portion of the angle iron support 15. Atop the support 15, the upper length of rod 13 receives, seriatim, a washer 16, a compression spring 17 and an upper washer 18.

With the spring 17 compressed, a cotter pin or hairpin key 19 is inserted in one of the plurality of holes 13a in the rod 13 to engage the upper washer 18 and capture the spring 17 between the key 19 and the upper surface of the angle support 15. So installed, the spring operates against the key 19 to pull the rod 13 and bag filter retaining cap 12 upwardly to tension the sleeve filter 11 in accordance with the amount of compression dictated by the spring 17.

The uppermost hole 13a in the rod 13 is fitted with a second cotter pin or hair-pin key 20, the purpose of which will be explained in connection with the tensioning tool and method now to be described.

The first embodiment of the invention utilizes a pneumatic system. As shown in FIGS. 1 and 2, the tensioning tool, generally designated by the numeral 21, includes a pneumatic cylinder 22 fitted with an internally slidable piston 23. A piston rod 24 is secured to the bottom of the piston 23 and projects outwardly from the lower end of the cylinder 22. A helical compression spring 25 encircles the piston rod 24 within the cylinder 22 and is captured between the lower surface of the piston 23 and the bottom end of the cylinder 22 to urge the piston 23 upwardly as shown in FIG. 1.

Secured to the lower end of the cylinder 22, as by nut 26, and projecting outwardly therefrom is a bifurcated, upper foot 27 having like forks 27a and b which are spaced apart to receive therebetween the rod 13 from the filter assembly 10 as shown in FIG. 3. The outer ends of the forks 27a and b of the upper foot 27 have formed therein aligned depressions or channels 27c and b to engage the key 20 carried on the elongate rod 13 of the filter assembly 10 in order to prevent the upper foot 27 from slipping from engagement with said key 20 during application of the tensioning tool 21 as will become apparent.

Secured to the lower end of the piston extension rod 24 by means of a nut 28 or other suitable attachment is a lower, bifurcated foot 29 having spaced apart forks 29a and b to receive therebetween the elongate rod 13 of the filter assembly 10. As best illustrated in the enlarged view of FIG. 5, the lower foot 29 is tapered from a thicker portion 29c adjacent the extendible piston rod 24 outwardly to a thinner portion 29d at the ends of the forks 29a and b to facilitate insertion and removal of the lower foot 29 from between the compression spring 17 of the filter assembly 10 and the locking key 19 carried on the rod 13.

The upper end of the cylinder 22 is fitted with an on-off actuator valve 30 having a two position lever 31. In one position, the valve 30 admits compressed air to the interior of the cylinder 22 and in the other position vents the interior of the cylinder 22 to the atmosphere to permit the piston 23 to return to the upper end of the cylinder 22 under the influence of the compression spring 25 contained within the cylinder 22. The actuator valve 30 is equipped with a male "quick connect" pneumatic fitting 32 which is coupled to a female "quick connect" pneumatic fitting 33 connected to the end of a flexible hose 34 of suitable length. As schematically shown in FIG. 1, the other end of the flexible hose 34 is connected to compressed air equipment. This equipment includes a compressed air source, such as a compressor 35, a pressure regulating valve 36 to control the downstream pressure of the compressed air, a gauge 37 to visually assist the operator in setting an appropriate pressure with the aid of the regulating valve 36 and a flow control valve 38 to regulate the speed at which compressed air is delivered to the tensioning tool 21.

In operation, a filter bag 11 with the upper retainer assembly installed on the upper end of the bag as previously described is installed within the baghouse by first securing the lower end of the filter sleeve 11 to the cell plate. The elongate rod 13 of the retainer assembly is then inserted in an appropriate opening in the support frame 15 so the filter sleeve 11 will be vertically oriented. The washers 16 and 18 and compression spring 17 are inserted over the end of the rod 13 which projects above the support frame 15 and a key, like clip 20, is inserted in one of the holes 13a in that portion of the rod 13 which projects above the compression spring 17. Thus, the filter sleeve 11 at this point is appropriately installed, but has not yet been properly tensioned such that the filter sleeve 11 itself is rather loose as illustrated in FIG. 1.

The tensioning tool 21 is positioned so that the lower foot 29 engages the upper washer 18 or compression spring 17 and the forks 27a and b of the upper foot 27 receive the upper pin 20. The pressure regulator 36 having been previously adjusted to provide a desired pressure and the flow control valve 38 having been previously adjusted to control the speed of extension of the piston rod 24 is therefore extended from the cylinder 22 and the lower foot 29 presses downwardly on the compression spring 17 while the upper foot 27 acts through the key 20 and retainer rod 13 to pull the filter sleeve 11 taut as shown in FIG. 2. The amount of force thus applied in tensioning the filter sleeve 11 is determined by the setting of the pressure regulating valve 36 which may be increased or decreased as necessary. With the retainer compression spring 17 compressed as shown in FIG. 2, a locking cotter pin or key 19 is inserted in one of the holes 13a through the retainer rod 13 just above the lower foot 29 as shown in FIG. 5. The operator then removes the tensioning tool 21 by sliding the lower foot 29 from between the locking pin 19 and the retainer washer 18. Turning the actuator lever 31 to the off position vents the cylinder 22 and the piston 23 returns to its original position under the influence of the return spring 25.

For maintenance, it may be desirable to periodically retension the filter bags 11. For such application, the lower foot 29 of the tensioning tool 21 is slipped between the locking pin 19 and the washer 18 or upper surface of the compression spring 17 and the actuator valve 30 of the tool is operated to admit compressed air into the cylinder 22. The cylinder 22 will thus move upwardly until the upper foot 27 engages the upper pin or key 20 on the retainer rod 13 after which the bag will be retensioned as determined by the pressure selected with the pressure regulating valve 36.

Where insufficient head room is present in some baghouses to prevent work from above, the tool 21 may be reversed from the position shown in FIG. 1 and the upper foot 27 may be inverted and installed on the outer end of the extension rod 24 while the lower foot 29 may be secured to the cylinder 22. Otherwise, operation of the equipment would be the same except the tool 21 would be applied to the retainer rod 13 from below and would be oriented approximately 180° from the views shown in FIGS. 1 and 2.

The second embodiment of the invention utilizes a hydraulic system to supply the tensioning force to the filter. As shown in FIG. 6, the tensioning tool, generally designated by the numeral 40, includes a hydraulic cylinder 41 fitted with an internally slidable piston 42. A piston rod 43 is secured to the bottom of the piston 42 and projects outwardly from the lower end of the cylinder 41. A helical compression spring 44 encircles the piston rod 43 within the cylinder 41 and is captured between the lower surface of the piston 42 and the lower end of the cylinder 41 to urge the piston 42 upwardly to the general position as shown in FIG. 6.

Secured to the lower end of the cylinder 41, as by screws 45, and projecting outwardly therefrom is a bifurcated upper foot 27 of the same configuration as previously described with reference to FIGS. 1–5. Thus, the upper foot 27 has spaced apart forks to receive therebetween the rod 13 from the filter assembly. The outer ends of the forks form aligned depressions or channels to engage the key 20 carried on the rod 13 to prevent the foot 27 from slipping from engagement with the key 20 during tensioning of the filter bag connected to rod 13 as previously described.

Secured to the lower end of the piston rod 43 by means of a nut 46 or other suitable attachment is a lower, bifurcated foot 29 of the same configuration as previously described with reference to FIGS. 1–5.

The upper end of the cylinder 41 is fitted with an off actuator valve 47 having a two position switch 48, inlet port 49 and exhaust port 50. In one position of switch 48, the valve 47 admits hydraulic fluid to the interior of the cylinder 41 through inlet port 49 and in the other position permits the escape of hydraulic fluid from the interior of the cylinder 41 through the exhaust port 50 to permit the piston 42 to return to the upper end of the cylinder 41 under the influence of the compression spring 44 contained within the cylinder 41. The inlet and exhaust ports 49 and 50 of the valve 47 are connected to hydraulic hoses from a hydraulic system schmetically shown in FIG. 6. The hydraulic system includes a hydraulic fluid pressurizing source, such as a motor and pump 51, a pressure regulator 52 to control the downstream pressure of the hydraulic fluid, a gauge 53 to visually assist the operator in setting the appropriate pressure with the aid of the pressure regulator 52 and a flow control valve 54 to regulate the flow rate at which hydraulic fluid is delivered to the tensioning tool 40.

The hydraulic system also conventionally includes a bypass circuit containing a relief valve 55 to protect the motor and pump 51 in the event pressures are encountered which are higher than the set point pressure of the regulator 52. Hydraulic fluid flowing through the relief valve 55 is blocked from delivery to the tensioning tool 40 by a check valve 56 and, thus, the hydraulic fluid is delivered to the reservoir or tank 57 for holding the hydraulic fluid in the closed system as illustrated.

In operation, the tensioning tool 40 is applied to the filter retainer assembly in the same manner as previously described with reference to FIGS. 1–5. The pressure regulator 52 having been previously adjusted to provide the desired pressure (i.e., the maximum force to which the filter is to be tensioned) and the flow control valve 54 having been previously adjusted to control the flow of hydraulic fluid and, thus, the speed of extension of the piston rod 43 of the tensioning tool 40, the actuator valve 47 is switched to admit hydraulic fluid to the cylinder 41. The piston rod 43 is therefore extended from the cylinder 41 and the lower foot 29 presses downwardly on the compression spring 17 while the upper foot 27 acts through the key 20 and retainer rod 13 to pull the filter sleeve taut. The amount of force thus applied in tensioning the filter sleeve 11 is determined by the setting of the pressure regulating valve 52 which may be increased or decreased as necessary. With the retainer compression spring 17 compressed, a locking key 19 is inserted in one of the holes 13a through the retainer rod 13 just above the lower foot 29. The operator then removes the tensioning tool 40 by sliding the lower foot 29 from between the locking pin 19 and the retainer washer 18. Turning the actuator switch 48 to the off position permits hydraulic fluid to flow from the interior of the cylinder 41 through exhaust point 50 and back to the fluid reservoir 57 under the influence of the force provided by the return spring 44.

The third embodiment of the invention utilizes an electromechanical system to supply the force for tensioning the filter. As shown in FIG. 7, the tensioning tool, generally designated by the numeral 60, includes a cylindrical housing or barrel 61 having secured to the upper end thereof a reversible, electric motor 62 having an output shaft 63 which projects within the barrel 61. The motor 62 includes a three position (i.e., forward, off, and reverse) an electrical cord 64 for connection to a conventional power source. The motor 62 further includes a reversing switch 65 and a speed control 66 to vary the rotational speed of the output shaft 63. The output shaft 63 is pinned by a roll pin 67 to an externally threaded spline housing 68. An adjustable spring tensioning nut 69 is carried on the spline housing which interiorly receives a telescoping spline 70 having a top friction pad 71 connected to the end thereof. A compression spring 72 encircles the spline 70 and is captured between the top pad 71 and the tension nut 69 so that adjustment of the tension nut 69 through opening 61a in the barrel 61 permits variation of the spring force applied to the top pad 71. The top pad 71 engages a bottom pad 72 to form, in combination, a friction clutch. The bottom pad 72 is connected to the upper end of a lead screw 73 mounted at its lower end by a thrust bearing 74 to the lower end of the barrel 61.

Secured to the lower end of the barrel 61, as by screws 75, and projecting outwardly thereform is a bifurcated lower foot 29 of the same configuration as shown in FIGS. 1-6.

Carried on the lead screw 73 is a travelling block 76 which, as shown in FIG. 9, has a portion which projects outwardly from the interior of the barrel 61 through an elongate slot 61b. Secured to the travelling block 76 is a bifurcated upper foot 27 having spaced apart fork ends to receive therebetween the rod 13 from the filter assembly. The foot 27 is of the same configuration as shown and described with reference to FIGS. 1-6.

In operation of this third embodiment of the invention, the filter retaining assembly is the same as that previously described. The tensioning tool 60 is positioned so that the lower foot 29 engages the upper washer 18 or compression spring 17 and the upper foot 27 receives the upper pin 20. The tensioning nut 69 of the friction clutch assembly having been previously adjusted to provide the desired force, and the speed control dial 66 having been previously adjusted to control the rotational speed of the output shaft 63 of the electric motor 62, the control switch 65 is turned on to cause operation of the motor. Rotation of the output shaft 63 is translated through the friction clutch to rotation of the lead screw 74 which causes the travelling block to be carried upwardly within the barrel 61. The lower foot 29 presses downwardly on the compression washer 18 while the upper foot acts through the key 20 and retainer rod 13 to pull the filter sleeve 11 upwardly and taut. The amount of force thus applied in tensioning the filter sleeve 11 is determined by the friction clutch assembly and may be increased or decreased as necessary by adjusting the tension nut 69 through the opening 61a. When the appropriate tensioning force is reached, top pad 71 will rotatably slip against bottom pad 72 so that rotation of the output shaft 63 is no longer imparted to the lead screw 73 and the travelling block 76 will thereby cease its upward movement within the barrel 61. With the compression spring 17 thus compressed, a locking cotter pin or key 19 is inserted in one of the holes 13a through the retainer rod 13 just above the lower foot 29. Positioning the switch 65 to operate the motor 62 in the reverse direction will permit the travelling block 76 to move downwardly within the barrel 61 to return the upper foot 27 to a lower position as shown in FIG. 7 to permit the operator to remove the tensioning tool 60 by sliding the lower foot 29 from between the locking pin 19 and the retainer washer 18.

Accordingly, the teachings of the present invention with respect to the tensioning of filter bags are adapted to a wide variety of power sources sufficient to supply a tensioning force. As disclosed, power sources useful with this invention include pneumatic, hydraulic and electromechanical sources.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. In an inside to outside dust collector having a bag support frame and a cell plate to which is connected one end of a fabric sleeve filter, in combination, a tensioning bag retainer comprising:
    (a) a circular bag support member which carries, in sealing engagement therewith, the other end of said fabric sleeve filter;
    (b) an elongate shaft secured to said bag support member and extending upwardly through said bag support frame, said elongate shaft including a plurality of spaced holes bored laterally through said shaft in the portion thereof extending above said bag support frame;
    (c) compressible tension means received on said elongate shaft which projects above said bag support frame, said tension means including spring means received on said elongate shaft;
    (d) an adjustable pin removably disposed through one said hole of said shaft above said spring means whereby said spring means is captured between said pin and said bag support frame and said spring means acts against said pin to apply tension to said fabric sleeve filter; and
    a tensioning tool having an elongate shaft receiving member for receiving the shaft and a tension means engaging arm for compressing the spring whereby the distance between said member and said arm may be controllably varied to apply tension to said fabric filter.

2. Apparatus for tensioning a fabric sleeve filter supported from a bag support frame by a bag retainer assembly comprising a vertical rod connected to the end of said sleeve filter and a tensioning spring received on the upper portion of said rod above said support frame, said apparatus comprising:

a tensioning tool having a retainer rod receiving member for receiving the rod attached thereto and having an extended arm to engage said tensioning spring;

switch means connnected to said tool operable in one position to extend the relative distance between said retainer rod receiving member and said extended arm and operable in a second position to retract the relative distance between said retainer rod receiving member and said extended arm; and power means connected to said switch means, said power means including regulating means to control the speed of extending the relative distance between said retainer rod receiving member and said extended arm.

3. The apparatus as in claim 2, said power means including an adjustable control means to determine a preselected force to apply to said tension spring.

4. A process for tensioning a fabric sleeve retainer supported from a bag support frame by a bag retainer assembly comprising a vertical rod connected to the end of said sleeve filter and extended upwardly through said bag support frame and a tensioning spring received on the upper portion of said rod and positioned on said support frame; the steps of said process comprising:

gripping the upper end of said bag retainer rod with a tensioning tool having an extended arm;

compressing said tensioning spring with the extended arm of said tool simultaneous with said gripping step whereby said fabric sleeve filter is appropriately tensioned; and installing a removable retainer on said vertical rod adjacent said tensioning spring when said sleeve filter is appropriately tensioned to capture said tensioning spring between said retainer and said bag support frame.

5. The process as in claim 4, said compressing step includes applying a preselected upward force on said bag retaining rod to tension said fabric sleeve filter.

6. The process as in claim 4, said gripping step includes installing a pin member on the upper end of said bag retainer rod and removably engaging said pin member with said tensioning tool.

7. The process as in claim 4, said compressing step includes simultaneously applying a downward force on said tensioning spring and an upward force on said bag retainer rod to tension said fabric sleeve filter.

8. The process as in claim 7, said compressing step simultaneously applied with a power source selected from the group consisting of pneumatic, hydraulic and electromechanical power sources.

9. The process as in claim 4, said compressing step includes applying an upward force on said bag retainer rod at a controlled rate to regulate the speed of tensioning said fabric sleeve filter.

10. The process as in claim 9, said compressing step further includes applying a preselected upward force.

* * * * *